Patented June 15, 1948

2,443,305

UNITED STATES PATENT OFFICE 2,443,305

PYRIMIDINE DERIVATIVES

Francis Henry Swinden Curd, Manchester, England, Margaret Isabel Hall (née Davis), Annan, Scotland, and Edmund Cecil Owen, Francis Leslie Rose, and George Alfred Peter Tuey, Manchester, England, assignors to Imperial Chemical Industries Limited, a corporation of Great Britain No Drawing. Application August 28, 1945, Serial No. 613,218. In Great Britain September 25, 1944

5 Claims. (Cl. 260—251)

This invention relates to the manufacture of new pyrimidine compounds which are useful as chemotherapeutic agents and as intermediates therefor. Many of them are useful as parasiticidal agents, especially against the malaria parasites.

The said new compounds are pyrimidine derivatives of the formula—

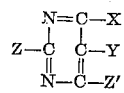

wherein X is hydrogen or a hydrocarbon radical, Y is hydrogen or a neutral substituent, such, for example, as a hydrocarbon radical, an alkoxy or aryloxy or alkylmercapto group, or a cyano or nitro group, and also X and Y may be joined together to form an alkylene chain, and of the groups Z and Z', one is an arylamino group which may be substituted or unsubstituted but must be free from strongly acidic groups of the kind hereinafter described, and the other is a radical of the form—NR''—A—NRR' wherein R'' is hydrogen or an alkyl or simply substituted alkyl group, for example, an alkoxyalkyl or dialkylaminoalkyl group, A is a linking group, which is aliphatic or alicyclic or aliphatic-carbocyclic and may be substituted, for example, by hydrocarbon radicals, alkoxy groups or dialkylaminoalkyl groups, and, where A or part of A is an aliphatic chain it may be interrupted by oxygen, nitrogen or sulphur atoms and NRR' is a substituted amino group such as acylamino, alkylamino or dialkylamino or piperidino or other strongly basic nitrogen-containing heterocyclic group.

We make the said new compounds by a process comprising the interaction of an arylamine optionally substituted in the manner indicated with an appropriate pyrimidine derivative bearing in the 2- or 4-position the group—NR''—A—NRR', in the 5- and 6-positions the groups Y and X respectively and in the 4- or 2-position a halogen atom.

The reaction is conveniently brought about by heating the reagents together, optionally in the presence of a solvent or diluent. The reagents need not be present in the exact stoichiometric proportions; in fact it is sometimes convenient to use an excess of the arylamine as a solvent or diluent. If desired, the arylamine may be used in the form of a salt such as the hydrochloride or acetate, or the pyrimidine derivative may be used in the form of a salt preferably with one equivalent of acid, for example, the monohydrochloride. It is particularly convenient to work in an aqueous medium, using one molecular proportion each of the halogeno-pyrimidine and the arylamine and one molecular proportion or a slight excess thereover of a mineral acid.

The arylamines to be used as starting materials and hence also the arylamino groups introduced into the molecule may be unsubstituted or may bear one or more substituents provided that they are free from strongly acidic groups. The term "strongly acidic groups" as used herein includes sulphonic acid, sulphuric ester (i. e., sulphato), carboxylic acid, phosphonic acid, arsonic acid and like acid groups; it does not include the relatively feebly acidic groups such as phenolic hydroxyl and mercapto groups. These latter groups and likewise halogen atoms, nitro groups, hydro-carbon radicals (which themselves may optionally bear substituents and which may be attached to the arylamino group directly or indirectly, as for instance through an oxygen, nitrogen or sulphur atom or a carbonyl group), cyano groups and esterified carboxyl groups are examples of substituents which may be present in the arylamino group.

Then as examples of particular arylamines suitable to be used as starting materials there may be mentioned aniline, o, m- and p-chloroanilines, o- and p-methoxyanilines, o, m- and p-toluidines, o- and p-bromoanilines, p-methylmercaptoaniline, 2:4-, 3:4- and 2:5-dichloroanilines, 3:4-dimethylaniline, 2-methyl-4-chloroaniline, 3-chloro-4-methylaniline, p-dimethylaminoaniline, p-nitroaniline, p-mercaptoaniline, p-hydroxyaniline, p-dimethylaminosulphonylaniline, p-cyanoaniline, p-ethoxyaniline, p-carbomethoxyaniline, p-n-butylaniline, p-phenylaniline, α- and β-naphthylamines, 4-chloro-α-naphthylamine, 6-bromo-β-naphthylamine, 6-methoxy-β-naphthylamine and 6-hydroxy-β-naphthylamine.

The 2- or 4-halogenopyrimidine compounds used as starting materials may be made by reaction of a halogenating agent such as a phosphorus pentahalide or oxyhalide with the corresponding hydroxypyrimidine compounds, our copending application Serial No. 613,217 of even date herewith.

The new 2- or 4-arylaminopyrimidines bearing a basic substituent in the 4- or 2-position and optionally bearing other substituents in the 5- and 6-positions obtained in accordance with this invention are strongly basic colourless or pale yellow viscous oils or crystalline solids. When the bases are oils, the picrates, which are crystalline, may be used for purposes of characterisation. The bases form colourless salts with mineral and organic acids. The salts with mineral acids such as hydrogen halides, sulphuric and phosphoric acids or with lower organic acids such as acetic, lactic, tartaric and lower alkanesulphonic acids (e. g., methanesulphonic acid) are water-soluble. The salts with acids of higher molecular weight such as methylene bis-2:3-hydroxynaphthoic acid and methylene bis-salicyclic acid are more sparingly soluble in water.

The following examples illustrate, but do not limit, the invention. The parts are by weight.

Example 1

5.2 parts of 4-chloro-2-γ-diethylaminopropylamino-6-methylpyrimidine, 3.3 parts of p-chloroaniline hydrochloride and 7.68 parts of p-chloroaniline are mixed and heated to 170°–175° C. for 2 hours. The mixture is cooled and stirred with 50 parts of benzene to dissolve out unchanged p-chloroaniline and the undissolved residue is filtered off and dried. It is purified by dissolving in 40 parts of water containing 1 part of acetic acid and 1 part of sodium acetate, heating the solution with decolourising carbon and filtering hot. The dihydrochloride is then salted out from the filtrate by addition of sodium chloride, filtered off and washed with a little cold water. The 2-γ-diethylaminopropylamino-4-p-chloroanilino-6-methylpyrimidine dihydrochloride thus obtained is finally purified by crystallisation from methanol and then has M. P. 268°–270° C. 2-γ-diethylaminopropylamino-4-p-chloroanilino-6-methylpyrimidine also forms a monohydrochloride-monopicrate, M. P. 236°–238° C. and dipicrate, M. P. 212°–214° C.

By working in a similar manner, using a mixture of the arylamine and arylamine hydrochloride but starting from other appropriate arylamines and halogenopyrimidines the following further compounds are obtained.

Example 2

2-β-diethylaminoethylamino-4-p-chloroanilino-6-methylpyrimidine dihydrochloride, M. P. 266°–268° C.

Example 3

2-β-diethylaminoethylamino-4-p-methylanilino-6-methylpyrimidine dihydrochloride, M. P. 236°–238° C.

Example 4

2-β-diethylaminoethylamino-4-(6'-bromo-2'-naphthylamino)-6-methylpyrimidine dihydrochloride, M. P. 266°–268° C. the dipicrate has M. P. 224°–225° C.

Example 5

2-β-diethylaminoethylamino-4-p-methoxyanilino-6-methylpyrimidine dihydrochloride, M. P. 216°–218° C.; the dipicrate has M. P. 180° C.

Example 6

2-β-diethylaminoethylamino-4-(3':4'-dichloroanilino)-6-methylpyrimidine dihydrochloride, M. P. 260°–261° C.; the dipicrate has M. P. 218°–219° C.

Example 7

2-β-diethylaminoethylamino-4-anilino-6-methylpyrimidine dihydrochloride, M. P. 238° C.; the monohydrochloride monopicrate (made by adding picric acid in alcohol to a solution of the dihydrochloride in alcohol) has M. P. 228° C.

Example 8

2-β-diethylaminoethylamino-4-p-nitroanilino-6-methylpyrimidine dihydrochloride, M. P. 293° C.

Example 9

2-β-diethylaminoethylamino-4-p-cyanoanilino-6-methylpyrimidine dihydrochloride, M. P. 307°–308° C.

Example 10

5.5 parts of 4-chloro-2-δ-diethylaminobutylamino-6-methylpyrimidine, 7.68 parts of p-chloroaniline and 3.3 parts of p-chloroaniline hydrochloride are mixed and heated at 150°–160° C. for 2 hours. The reaction mixture is extracted several times with hot benzene. The undissolved residue is then dissolved in water, acetic acid and sodium acetate added and the solution is extracted twice with benzene. The aqueous layer is separated, stirred with decolourising carbon and filtered. Caustic soda is added to the filtrate and the base, which is precipitated as an oil, is extracted with chloroform. The chloroform extract is dried over sodium sulphate and the chloroform is distilled off. The oil remaining is 2-δ-diethylaminobutylamino-4-p-chloroanilino-6-methylpyrimidine which is converted into its dihydrochloride with hydrochloric acid in aqueous methanol. Recrystallised from aqueous methanol the dihydrochloride has M. P. 197°–198° C. The corresponding dipicrate crystallises from β-ethoxyethanol: M. P. 226°–227° C.

Example 11

4.0 parts of 4-chloro-2-γ-dimethylaminopropylamino-6-methylpyrimidine, 2.9 parts of p-chloroaniline hydrochloride and 6.7 parts of p-chloroaniline are mixed together and heated to 165°–170° C. for 2 hours. The reaction mixture is cooled and then boiled with benzene and the undissolved residue is filtered off, dried and crystallised several times from methanol. There is thus obtained 2-γ-dimethylaminopropylamino-4-p-chloroanilino-6-methylpyrimidine dihydrochloride of M. P. 270° C.

By working in a similar manner to that described in Example 11, but using other appropriate starting materials, the following further compounds are obtained.

Example 12

2-γ-dibutylaminopropylamino-4-p-chloroanilino-6-methylpyrimidine dihydrochloride, M. P. 171°–173° C.; the dipicrate has M. P. 220°–222° C.

Example 13

2-γ-piperidinopropylamino-4-p-chloroanilino-6-methylpyrimidine dihydrochloride, M. P. 277°–279° C.

Example 14

2-γ-diethylaminopropylamino-4-p-chloroanilino-5-ethyl-6-methylpyrimidine dihydrochloride, M. P. 245°–246° C.

Example 15

2-γ-butylaminopropylamino - 4 - p - chloroanilino-6-methylpyrimidine dihydrochloride, M. P. 301°–303° C.

Example 16

2-γ-dibutylaminopropylamino - 4 - p - chloroanilino - 5 - ethyl-6-methylpyrimidine dihydrochloride, M. P. 215°–216° C.

Example 17

12.1 parts of 2-chloro-4-β-diethylaminoethylamino-6-methylpyrimidine and 12.5 parts of p-chloroaniline are heated together at 150°–160° C. for 6 hours. The reaction mixture is dissolved in hot dilute hydrochloric acid and the solution is filtered, cooled and basified with caustic soda solution. The base, which is liberated as an oil, is extracted with chloroform, the solution is dried over anhydrous potassium carbonate and the chloroform is distilled off. 2-p-chloroanilino-4-β-diethylaminoethylamino-6 - methylpyrimidine remains. It is distilled in vacuo and the fraction of B. P. 204°–208° C./0.2 mm. is collected. The picrate, made by interaction with picric acid in ethanol and crystallised from β-ethoxyethanol, has M. P. 218°–219° C.

The base is converted to the hydrochloride by dissolving in 2-normal hydrochloric acid and evaporating the solution to dryness. After drying, the residue is crystallised from alcohol. There is thus obtained 2-p-chloroanilino-4-β-diethylaminoethylamino-6-methylpyrimidine dihydrochloride, M. P. 270°–271° C.

By working in a similar way to that just described, but using other appropriate arylamines as starting materials there are obtained the following further 2-arylamino-4-β-diethylaminoethylamino-6-methylpyrimidines in the form of their dihydrochlorides.

Example 18

2-p-methoxyanilino-4 - β - diethylaminoethylamino-6-methylpyrimidine dihydrochloride, M. P. 231°–232° C.

Example 19

2-p-methylanilino-4-β - diethylaminoethylamino-6-methylpyrimidine dihydrochloride, M. P. 216°–218° C.

Example 20

2-p-methylmercaptoanilino-4-β-diethylaminoethylamino-6-methylpyrimidine dihydrochloride, M. P. 232°–234° C.

Example 21

2-β-naphthylamino- 4 - β - diethylaminoethylamino-6-methylpyrimidine dihydrochloride, M. P. 252°–254° C. (decomp.).

Example 22

2-(6'-bromo-2'-naphthylamino)-4- β - diethylaminoethylamino-6 - methylpyrimidine dihydrochloride, M. P. 290° C. (decomp.).

Example 23

2-(6'-methoxy-2'-naphthylamino) - 4 - β - diethylaminoethylamino-6-methylpyrimidine dihydrochloride, M. P. 228°–230° C. (decomp.).

Example 24

2-o-chloroanilino-4- β - diethylaminoethylamino-6-methylpyrimidine dihydrochloride, M. P. 251°–253° C.

Example 25

2-anilino - 4 - β - diethylaminoethylamino - 6 - methylpyrimidine dihydrochloride, M. P. 264° C. (decomp.).

Example 26

2-o-methoxyanilino- 4 - β - diethylaminoethylamino-6-methylpyrimidine dihydrochloride, M. P. 272°–273° C.

Example 27

2-o-methylanilino-4-β - diethylaminoethylamino-6-methylpyrimidine dihydrochloride, M. P. 237°–238° C.

Example 28

2-m-methylanilino-4-β-diethylaminoethylamino-6-methylpyrimidine dihydrochloride, M. P. 272°–274° C.

Example 29

2-p-ethoxyanilino-4-β- diethylaminoethylamino-6-methylpyrimidine dihydrochloride, M. P. 211°–213° C.

Example 30

2-α-naphthylamino- 4 - β - diethylaminoethylamino-6-methylpyrimidine dihydrochloride, M. P. 275°–276° C. (decomp.).

Example 31

2-(4'-chloro-1'-naphthylamino)-4- β - diethylaminoethylamino-6-methylpyrimidine dihydrochloride, M. P. 294°–295° C.

Example 32

7.8 parts of 2-γ-dibutylaminopropylamino-4-chloro-6-methylpyrimidine, 5.5 parts of 6-bromo-β-naphthylamine, 2.5 parts of concentrated hydrochloric acid and 25 parts of water are heated to reflux for one hour. On cooling, the product which crystallises out is filtered off and dissolved in hot water and the solution is acidified with hydrochloric acid. 2-γ-dibutylaminopropylamino-4-(6'-bromo-β-naphthylamino) - 6 - methylpyrimidine dihydrochloride crystallises out and is filtered off and dried. It may be purified by crystallisation from a mixture of ethyl alcohol and ethyl acetate and then has M. P. 250°–252° C.

By working in a similar manner with other appropriate starting materials, using in each case equimolecular proportions of the arylamine, chloropyrimidine and hydrochloric acid, there are obtained the following further compounds.

Example 33

2-γ-diethylaminopropylamino-4-(6'-bromo-2'-naphthylamino)-6 - methylpyrimidine dihydrochloride, M. P. 259°–261° C.

Example 34

2-β-diethylaminoethylamino-4-(6'-bromo- 2' - naphthylamino)-6 - methylpyrimidine dihydrochloride, M. P. 266°–268° C.

Example 35

2-γ-dibutylaminopropylamino-4-p - bromoanilino-6-methylpyrimidine dihydrochloride, M. P. 160°–161° C.

Example 36

2-γ-dibutylaminopropylamino-4-p - chloroanilino-6-methylpyrimidine dihydrochloride, M. P. 171°–173° C.

Example 37

2 - γ - diethylaminopropylamino-4-p-chloroanilino - 6 - methylpyrimidine dihydrochloride, M. P. 268°–270° C.

Example 38

2 - γ-piperidinopropylamino-4-m-nitroanilino-6-methylpyrimidine dihydrochloride, M. P. 262°–264° C.

Example 39

2 - γ - piperidinopropylamino-4-(6'-bromo-2'-naphthylamino) - 6 - methylpyrimidine dihydrochloride, M. P. 288°–289° C.

Example 40

2 - γ-piperidinopropylamino-4-p-nitroanilino-6-methylpyrimidine dihydrochloride, M. P. 277°–279° C.; the base has M. P. 174°–175° C.

Example 41

2 - γ - dibutylaminopropylamino-4-p-cyanoanilino - 6 - methylpyrimidine dihydrochloride, M. P. 224°–226° C.

Example 42

2 - (N-methyl-N-β-diethylaminoethyl-amino)-4 - p-chloranilino-6-methylpyrimidine dihydrochloride, M. P. 244°–246° C.; the base has M. P. 83°–85° C.

Example 43

2 - γ - diethylaminopropylamino-4-p-cyanoanilino-6-methylpyrimidine dihydrochloride, M. P. 274°–275° C.

Example 44

2 - γ-piperidinopropylamino-4-p-cyanoanilino-6-methylpyrimidine dihydrochloride, M. P. 280°–282° C.

Example 45

7.5 parts of 2-γ-dibutylaminopropylamino-4-chloropyrimidine, 3.2 parts of p-chloroaniline, 2.5 parts of concentrated hydrochloric acid and 25 parts of water are refluxed together for 1 hour. The solution so obtained is evaporated to dryness under diminished pressure and the residue is crystallised from a mixture of ethanol and ethyl acetate. There is thus obtained 2-γ-dibutylaminopropylamino - 4-p-chloroanilino-6-methylpyrimidine dihydrochloride of M. P. 155°–157° C.

By working in a similar manner with other appropriate starting materials the following further compounds are obtained.

Example 46

2 - p - hydroxyanilino-4-β-diethylaminoethylamino-6-methylpyrimidine dihydrochloride, M. P. 270°–272° C.

Example 47

2 - γ - diethylaminopropylamino-4-p-hydroxyanilino-6-methylpyrimidine dihydrochloride, M. P. 269°–271° C. (decomp.).

Example 48

2 - γ - dibutylaminopropylamino-4-p-hydroxyanilino-6-methylpyrimidine dihydrochloride, M. P. 120°–122° C.

Example 49

A mixture of 6.4 parts of 2-γ-diethylaminopropylamino - 4 - chloro-6-methylpyrimidine, 3.45 parts of p-nitroaniline, 40 parts of water, 10 parts of acetone and 2.5 parts of concentrated hydrochloric acid are refluxed for 1 hour. On cooling 2 - γ - diethylaminopropylamino-4-p-nitroanilino - 6-methylpyrimidine dihydrochloride crystallises out and is filtered off, dried and recrystallised from alcohol to which a small portion of water has been added. It then forms yellowish blunt needles of M. P. 273°–275° C.

Example 50

3.2 parts of 2-chloro-4-γ-diethylaminopropylamino-6-methylpyrimidine, 1.6 parts of p-chloroaniline, 1.2 parts of concentrated hydrochloric acid, 15 parts of water and 5 parts of acetone are refluxed together for 1 hour. The clear solution so obtained is diluted with water and made alkaline with caustic soda. The base which is liberated is extracted with chloroform, the extract is dried and the chloroform is distilled off. The residue is distilled under diminished pressure, whereby 2 - p-chloroanilino-4-γ-diethylaminopropylamino-6-methylpyrimidine is obtained in the form of an oil of B. P. 210°–218° C./0.15 mm. It forms a dipicrate of M. P. 225°–226° C. and a dihydrochloride of M. P. 252°–254° C.

By working in a similar manner but using other appropriate starting materials there are obtained the following further compounds.

Example 51

2 - p-dimethylaminoanilino-4-γ-diethylaminopropylamino-6-methylpyrimidine; the trihydrobromide, made by dissolving the base in hydrobromic acid and adding acetic acid, has M. P. 256°–258° C.

Example 52

2 - β-naphthylamino-4-γ-diethylaminopropylamino-6-methylpyrimidine dihydrochloride, M. P. 259°–260° C. (decomp.).

Example 53

2 - (2' - methyl-4'-chloroanilino)-4-γ-diethylaminopropylamino-6-methylpyrimidine dihydrochloride, M. P. 150°–152° C.

Example 54

2 - o - chloroanilino-4-γ-diethylaminopropylamino-6-methylpyrimidine dihydrochloride, M. P. 238°–239° C.

Example 55

2 - m - chloroanilino-4-γ-diethylaminopropylamino-6-methylpyrimidine dihydrochloride, M. P. 215°–217° C.

Example 56

2 - (2':4' - dichloroanilino)-4-γ-diethylaminopropylamino - 6-methylpyrimidine dihydrochloride, m. P. 208°–210° C.; the base has B. P. 208°–210° C./0.02 mm. and the dipicrate has M. P. 210°–211° C.

Example 57

2 - (3':4'-dichloroanilino)-4-γ-diethylaminopropylamino - 6 - methylpyrimidine dihydrochloride, M. P. 237°–239° C.

Example 58

2-(2':5'-dichloroanilino) -4-γ- diethylaminopropylamino-6-methylpyrimidine dihydrochloride, M. P. 248°–250° C.; the base has M. P. 98°–100° C. (decomp.).

Example 59

2-(6'-bromo-2'-naphthylamino) -4-γ- diethylaminopropylamino-6-methylpyrimidine dihydrochloride, M. P. 259°–260° C. (decomp.).

Example 60

2 - (3'-chloro-4'-methylanilino) -4-γ- diethylaminopropylamino-6-methylpyrimidine dihydrochloride, M. P. 230°–232° C.

Example 61

2-(3':4'-dimethylanilino) -4-γ- diethylaminopropylamino -6- methylpyrimidine dihydrochloride, M. P. 222°–224° C.

Example 62

2-(3':5'-dimethylanilino) -4-γ- diethylaminopropylamino -6- methylpyrimidine dihydrochloride, M. P. 306°–308° C.

Example 63

2-(3':5'-dibromoanilino) -4-γ- diethylaminopropylamino -6- methylpyrimidine dihydrochloride, M. P. 264°–266° C.

Example 64

2 -p- bromoanilino -4-γ- diethylaminopropylaminopropylamino-6-methylpyrimidine dihydrochloride, M. P. 255°–257° C.

Example 65

2 -p- butylanilino -4-γ- diethylaminopropylamino - 6 - methylpyrimidine dihydrochloride, M. P. 188°–190° C.

Example 66

2-p-carbomethoxyanilino -4-γ- diethylaminopropylamino -6- methylpyrimidine dihydrochloride, M. P. 263°–265° C.

Example 67

2 -p- phenylanilino -4-γ- diethylaminoethylamino - 6 - methylpyrimidine dihydrochloride, M. P. 244°–246° C.

Example 68

2-p-nitroanilino - 4 - γ - diethylaminopropylamino - 6 - methylpyrimidine dihydrochloride, M. P. 226°–232° C.

Example 69

2 -p- cyanoanilino -4-γ- diethylaminopropylamino - 6 - methylpyrimidine dihydrochloride, M. P. 249°–251° C.

Example 70

2 -p- chloroanilino -4-γ- diethylaminopropylaminopyrimidine dihydrochloride, M. P. 208°–210° C.

Example 71

14.2 parts of 2-δ-diethylamino-α-methylbutylamino-4-chloro-6-methylpyrimidine, 6.35 parts of p-chloroaniline, 50 parts of water and 4.4 parts of concentrated hydrochloric acid are refluxed together for 2 hours. The resulting clear solution is made alkaline with caustic soda and the oil which is precipitated is separated off and extracted several times with chloroform. The combined chloroform extracts are shaken several times with 5% acetic acid, and the acetic acid extracts are combined and made alkaline with caustic soda. The precipitate which forms is dissolved in chloroform, the chloroform solution is dried over potassium carbonate and the chloroform is distilled off. The remaining oil is then distilled in vacuo, whereby 2-δ-diethylamino-α-methylbutylamino -4-p- chloroanilino-6-methylpyrimidine is obtained as a colourless oil, B. P. 220°–223° C./0.15 mm. It can readily be converted into the dihydrobromide by solution in dilute hydrobromic acid and evaporation to dryness in vacuo; recrystallised from a mixture of ethanol and ethyl acetate the dihydrobromide forms colourless flat prisms of M. P. 200°–201° C. The dipicrate crystallises from a mixture of ethanol and β-ethoxyethanol in clusters of small yellow needles, M. P. 189°–190° C.

By working in the manner just described but using as starting materials 2-chloro-4-δ-diethylamino-α-methylbutylamino -6- methylpyrimidine and various arylamines, the following further compounds are obtained.

Example 72

2-p-chloroanilino-4-δ-diethylamino-α-methylbutylamino-6-methylpyrimidine, B. P. 204°–206° C./0.15 mm.; the dipicrate has M. P. 168°–170° C.

Example 73

2 - o-chloroanilino-4-δ-diethylamino-α-methylbutylamino-6-methylpyrimidine, B. P. 207°–210° C./1.0 mm.; the dihydrochloride has M. P. 106°–108° C.

Example 74

2-m-chloroanilino-4-δ-diethylamino-α-methylbutylamino-6-methylpyrimidine B. P. 235°–237° C./1.5 mm.; the dihydrochloride has M. P. 205°–207° C.

Example 75

2-p-bromoanilino-4-δ-diethylamino -α- methylbutyl-amino-6-methylpyrimidine, B. P. 240°–242° C./1.0 mm.; the dihydrochloride has M. P. 244° C.

Example 76

2-(3':4'-dichloroanilino) -4-δ- diethylamino-α-methylbutylamino-6-methylpyrimidine, B. P. 242°–246° C./1.0 mm.; the dihydrochloride has M. P. 257° C.

Example 77

2 - p - methoxyanilino -4 - δ - diethylamino-α-methylbutyl-amino-6-methylpyrimidine, B. P. 227°–231° C./1.0 mm.; the dihydrochloride has M. P. 245° C.

Example 78

2-o-methoxyanilino-4-δ-diethylamino-α-methyl-butylamino-6-methylpyrimidine, B. P. 229°–231° C./1.8 mm.; the dihydrochloride has M. P. 225°–227° C.

By working in the manner described in Example 71, but using other appropriate starting materials the following additional compounds are obtained.

Example 79

2-β - diethylaminoethylamino - 4-p-chloroanilino-6-methylpyrimidine, B. P. 193°–200° C./0.65 mm. After crystallisation from petroleum ether it has 97° C. The dipicrate has M. P. 227°–228° C.

Example 80

2-β - diethylaminoethylamino - 4-p-methylanilino-6-methylpyrimidine, M. P. 66°–68° C.; the dipicrate has M. P. 191°–193° C.

Example 81

2-β-diethylaminoethylamino-4-p-nitroanilino-6-methylpyrimidine, M. P. 161°–162° C.

Example 82

2-δ-diethylamino-α-methylbutyl - amino - 4-p-cyanoanilino-6-methylpyrimidine, B. P. 233°–239° C./0.15 mm. The dipicrate has M. P. 199°–200° C. and the dihydrobromide M. P. 216°–220° C.

Example 83

2-δ-diethylamino-α-methylbutyl - amino - 4-p-nitroanilino-6-methylpyrimidine; the dipicrate has M. P. 173°–176° C. and the dihydrochloride M. P. 114°–118° C.

Example 84

2-δ-diethylamino-α-methylbutyl-amino - 4-(6'-bromo-2'-naphthylamino) - 6-methylpyrimidine; the dipicrate has M. P. 238°–241° C. and the dihydrochloride M. P. 260°–262° C.

Example 85

2-γ-dibutylaminopropylamino-4-(2':4'-dichloroanilino)-6-methylpyrimidine, B. P. 220°–222° C./0.12 mm.; the dipicrate has M. P. 226°–227° C.

Example 86

2-γ-dibutylaminopropylamino-4-(3':4'-dichloroanilino)-6-methylpyrimidine; the dipicrate has M. P. 192°–193° C. and the dihydrochloride M. P. 240°–242° C.

Again by working as described in Example 71 but using other appropriate starting materials and purifying the final product by recrystallisation instead of by distillation, the following further compounds are obtained.

Example 87

2-γ-diethylaminopropylamino - 4 - p-nitroanilino-5-ethyl-6-methylpyrimidine, M. P. 126°–128° C.

Example 88

2-γ-dibutylaminopropylamino - 4 - p-nitroanilinopyrimidine, M. P. 111°–114° C., the dipicrate has M. P. 206°–207° C.

Example 89

2-γ-dibutylaminopropylamino-4 - (6'-bromo-2-naphthylamino)-6-methylpyrimidine. The base is an oil; the dipicrate has M. P. 219°–220° C. and the dihydrochloride M. P. 301°–303° C.

Example 90

2-γ-(β'-diethylaminoethoxy) - propylamino-4-p-nitroanilino-6-methylpyrimidine, M. P. 108°–109° C.

Example 91

2-γ-butylaminopropylamino - 4-p-nitroanilino-6-methylpyrimidine, M. P. 141°–143° C.

Example 92

2-γ-dimethylaminopropylamino - 4-p-nitroanilino-6-methylpyrimidine, M. P. 184° C.

Example 93

2-γ-(β'-diethylaminoethoxy) - propylamino-4-p-chloroanilino-6-methylpyrimidine. The base is an oil; the dipicrate has M. P. 148°–150° C. and the dihydrochloride M. P. 178°–180° C.

Example 94

2-γ-(N-methyl-N-β'-diethylaminoethyl - amino) -propylamino - 4-p-chloroanilino - 6-methylpyrimidine. The trihydrochloride has M. P. 239°–240° C.

Example 95

7.8 parts of 2-γ-dibutylaminopropylamino-4-chloro-6-methylpyrimidine, 4.1 parts of m-chloroaniline hydrochloride, 25 parts of water and 0.25 part of concentrated hydrochloric acid are refluxed together for 1 hour. The resulting solution is made alkaline with caustic soda and the oil which is precipitated is separated off and extracted with 5% acetic acid. The acetic acid extract is made alkaline with sodium hydroxide and the oil which is again precipitated is extracted with chloroform. The chloroform solution is dried and the chloroform is distilled off. The residue is 2-γ-dibutylaminopropylamino-4-m-chloroanilino-6-methylpyrimidine in the form of an oil which forms a dipicrate, M. P. 180°–181° C.

The base is converted into its dihydrochloride by stirring with 2-normal hydrochloric acid. The crystals are filtered off, dried and recrystallised first from a mixture of ethyl acetate and methanol and then from a mixture of butanol and ethyl acetate. It then forms colourless thick prisms, M. P. 221°–223° C.

Example 96

By working in the manner described in Example 71 but starting from 2-chloro-4-β-diethylaminoethylamino-6-methylpyrimidine and m-nitroaniline there is obtained 2-m-nitroanilino-4-β-diethylaminoethylamino-6-methylpyrimidine in the form of an oil. This is dissolved in dilute hydrochloric acid, the solution is evaporated to dryness in vacuo and the residue is crystallised from ethanol whereby the dihydrochloride is obtained with M. P. 258°–260° C. The dipicrate has M. P. 196°–197° C.

Example 97

7.1 parts of 2-γ-diethylaminopropylamino-4-chloro-5-ethyl-6-methylpyrimidine, 3 parts of p-cyanoaniline, 2.5 parts of concentrated hydrochloric acid and 25 parts of water are refluxed together for 1 hour. The solution is cooled and made alkaline with sodium hydroxide. The base which is precipitated is filtered off and redissolved in 5% aqueous acetic acid. The solution is again made alkaline with sodium hydroxide and the base is filtered off and dissolved in chloroform. The solution is dried and the chloroform is distilled off. The residue is recrystallised from aqueous ethanol and then from benzene. There is thus obtained 2-γ-diethylaminopropylamino-4-p-cyanoanilino-5-ethyl-6-methylpyrimidine of M. P. 151°–152° C.

Example 98

By working in a similar manner but starting from 2-γ-dibutylaminopropylamino-4-chloro-6-methylpyrimidine and p-nitroaniline, there is obtained 2-γ-dibutylaminopropylamino-4-p-nitroanilino-6-methylpyrimidine of M. P. 118°–119° C. The dihydrochloride has M. P. 224°–225° C.

Example 99

21.35 parts of 2-chloro-4-γ-diethylaminopropylamino-5-nitro-6-methylpyrimidine hydrochloride (M. P. 157–158° C. made by interaction of equimolecular proportions of γ-diethylaminopropylamine and 2:4-dichloro-5-nitro-6-methylpyrimidine in ethanol), 8.77 parts of p-chloroaniline and 125 parts of ethanol are refluxed together for 3 hours. The solid which has separated out is filtered off and stirred with sodium hydroxide solution and the base so liberated is extracted with chloroform. The chloroform is evaporated off and the residue is extracted with 500 parts of 5% aqueous acetic acid. The acetic acid solution is made alkaline with sodium hydroxide and the base which is precipitated is extracted with chloroform. The chloroform solution is dried, the chloroform is distilled off and the residue is crystallised from petroleum ether. There is thus obtained 2-p-chloroanilino-4-γ-diethylaminopropylamino - 5-nitro-6-methylpyrimidine of M. P. 94°–96° C.

Example 100

By working in the manner described in Example 99, but using as the chloro-compound 2- chloro-4-β-diethylaminoethylamino - 5 - nitro-6-methylpyrimidine hydrochloride (M. P. 220°–222° C., decomp., made by interaction of equimolecular proportions of β-diethylaminoethylamino and 2:4 - dichloro - 5 - nitro - 6 - methylpyrimidine in ethanol), there is obtained 2-p-chloroanilino-4-β - diethylaminoethylamino-5-nitro-6-methylpyrimidine of M. P. 95°–97° C.

Whereas the above description and examples illustrate many widely varied embodiments of the invention it will be apparent to one skilled in the art that many other embodiments and variations may be devised without departing from the spirit and scope thereof and accordingly it is to be understood that the invention is not in any way limited except as defined in the following claims.

In the claims below, the expression "strongly acidic groups" refers to radicals commonly recognized as ionizable, salt forming, acid radicals.

We claim:

1. The process of producing a pyrimidine compound having chemotherapeutic properties, which comprises reacting an aromatic amine devoid of strongly acidic groups with a pyrimidine compound bearing a halogen atom in one of the positions 2 and 4 and a diamine radical in the other of said two positions, said diamine radical having the form —NH—A—NRR', wherein NRR' is a strongly basic radical selected from the group consisting of primary, secondary and tertiary amine radicals and heterocyclic nitrogenous base radicals, while A is an organic radical linking the two N-atoms of the diamine and interposing therebetween at least two aliphatic carbon atoms.

2. The process of producing a pyrimidine compound having chemotherapeutic properties, which comprises reacting an aromatic amine as hereinbelow defined with a pyrimidine compound of the general formula

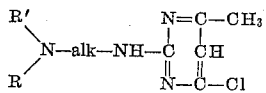

wherein alk designates an alkylene radical which interposes at least 2 and not more than 6 carbon atoms between the two N-atoms, R is a member selected from the group consisting of hydrogen and alkyl, while R' designates an alkyl radical; said aromatic amine being a primary aromatic amine of the benzene series which is devoid of strongly acid groups.

3. The process of producing a pyrimidine compound having chemotherapeutic properties, which comprises reacting an aromatic amine as hereinbelow defined with a pyrimidine compound of the general formula.

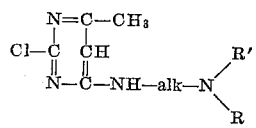

wherein alk designates an alkylene radical which interposes at least 2 and not more than 6 carbon atoms between the two N-atoms, R is a member selected from the group consisting of hydrogen and alkyl, while R' designates an alkyl radical; said aromatic amine being a primary aromatic amine of the benzene series which is devoid of strongly acidic groups.

4. A process as in claim 1, wherein reaction is effected by heating the aromatic amine and the pyrimidine compound in an aqueous medium, at reflux temperature, in the presence of hydrochloric acid.

5. A process as in claim 4, wherein the resulting compound is isolated in the form of its dihydrochloride.

FRANCIS HENRY SWINDEN CURD.
MARGARET ISABEL HALL (NÉE DAVIS).
EDMUND CECIL OWEN.
FRANCIS LESLIE ROSE.
GEORGE ALFRED PETER TUEY.

REFERENCES CITED

The following references are of record in the file of this patent:

Jour. Amer. Chem. Soc., vol. 67 (1945); pp. 1159–61 and 735–38.

Amer. Chem. Jour., vol. 33 (1905), pp. 439 and 449; and vol. 40 (1908), pp. 143–146.

Certificate of Correction

June 15, 1948.

Patent No. 2,443,305.

FRANCIS HENRY SWINDEN CURD ET AL.

It is hereby certified that errors appear in the printed specification of the above numbered patent requiring correction as follows: Column 2, line 50, after the word and comma "compounds," insert *see*; column 14, line 6, for "acid" read *acidic*; and that the said Letters Patent should be read with these corrections therein that the same may conform to the record of the case in the Patent Office.

Signed and sealed this 31st day of August, A. D. 1948.

[SEAL]

THOMAS F. MURPHY,
*Assistant Commissioner of Patents.*